United States Patent

Stachurski

[15] 3,639,173
[45] Feb. 1, 1972

[54] METHOD OF CONTROLLING ZINC DENDRITE GROWTH

[72] Inventor: Zbigniew Stachurski, Brooklyn, N.Y.

[73] Assignee: Yardney International Corp., New York, N.Y.

[22] Filed: Dec. 5, 1969

[21] Appl. No.: 878,971

Related U.S. Application Data

[63] Continuation of Ser. No. 675,617, Oct. 16, 1967, abandoned.

[52] U.S. Cl. .................................136/3, 136/6, 136/30, 136/181
[51] Int. Cl. ...........................H01m 43/00, H01m 45/04
[58] Field of Search .................136/3, 6, 30, 34, 164, 165, 136/179; 204/55

[56] References Cited

UNITED STATES PATENTS

3,424,617   1/1969   Grieger et al. ..........................136/6

Primary Examiner—Donald L. Walton
Attorney—Karl F. Ross and Herbert Dubno

[57] ABSTRACT

The growth of zinc dendrites during charge of a silver-zinc cell is a particularly undesirable feature of the zinc electrode as it eventually leads to shorting of the cell through growth of metallic trails of zinc through the separator. A method is disclosed of preventing the growth of zinc dendrites and more particularly of preventing zinc dendrite penetration of the separator. The method involves controlling the overpotential in the cell, i.e., limiting the overpotential to a value below the critical magnitude at which the zinc deposits as dendrites instead of as a moss. When zinc deposits as a moss, penetration of the separator does not occur. The new method involves so limiting the charge overpotential and using a charge rate that the cell is fully charged by the time the critical overpotential is reached. The overpotential is measured between the working zinc electrode and a built-in zinc reference electrode. When the critical overpotential is reached, charging is terminated.

The subject matter of the invention also includes an improved electrochemical apparatus whose efficiency and useful life derive from the prevention of zinc penetration of the separator.

9 Claims, 2 Drawing Figures

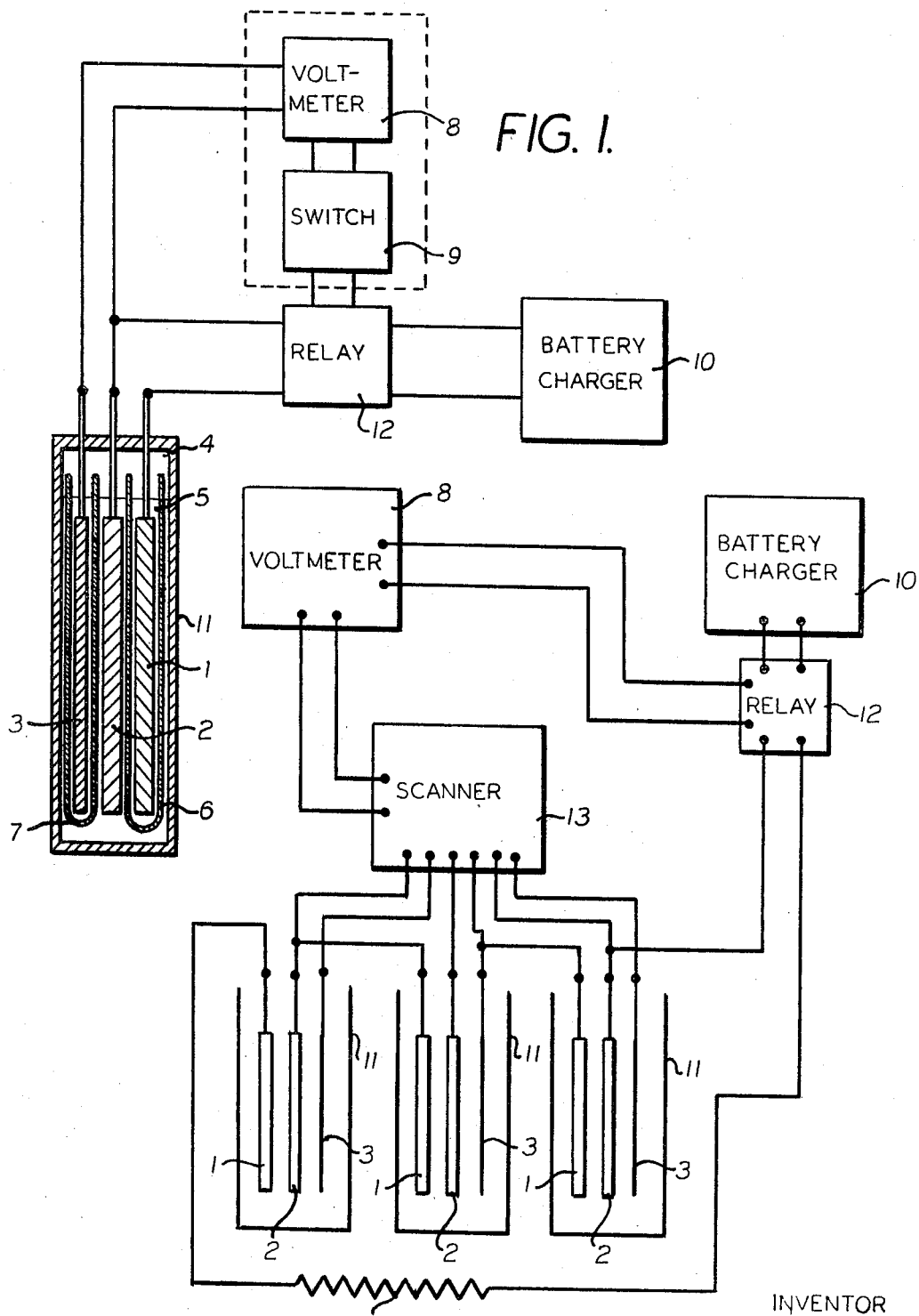

METHOD OF CONTROLLING ZINC DENDRITE GROWTH

The present application is a continuation of my application Ser. No. 675,617 filed Oct. 16, 1967, and now abandoned.

This invention relates to current-producing electrochemical cells and, more particularly, to cells whose efficiency, useful life and applicability depend on the interaction of one or more electrodes and an electrolyte in contact therewith.

The invention described herein was made in the performance of work under a NASA contract and is subject to the provisions of Section 305 of the National Aeronautics and Space Act of 1958, Public Law 85–568 (72 Stat. 435; 42 U.S.C. 2457).

The problems involved in the designing and use of current-producing electrochemical systems are manifold and, apart from structural considerations, derive from the interaction between an active material and the electrolyte between the closely spaced electrodes which, for considerations of high power density (i.e., available power per unit weight or volume), should have a spacing no greater than about 2 cm. Among the problems arising in systems of the type described are those concerning redeposition of active material upon one of the electrode surfaces. For example, rechargeable batteries or cells utilizing zinc/zinc-oxide electrodes have been characterized heretofore by the phenomenon of the growth of zinc dendrites during charge of zinc-containing cells such as the silver-zinc cell, which growth eventually leads to shorting of the cell through growth of metallic zinc trails through the separator. They are further characterized by the phenomenon that the character of the deposit formed during charging of an electrochemically reversible electrode varies from a fine soft nondendritic or mossy form to a deposit of larger, hard crystalline dendrites, only the dendritic form penetrating the separator and short circuiting the cell. Such short circuiting can be catastrophic.

It is the principal object of the present invention to provide a current-generating electrochemical system whereby the disadvantageous effects of zinc dendrite growth, penetration of the separator thereby and like efficiency-reducing phenomena can be significantly diminished and the cell life and useful current density improved, while affording a greater measure of control of the electrochemical reactions than possible heretofore.

A more specific object of this invention is to provide a relatively simple but effective method of, and system for, operating rechargeable current-producing cells and batteries for greatly extended periods without failure resulting from shorting as discussed above.

The present invention is based, at least in part, upon the discovery that it is possible to control the type of deposit obtained from an electrolyte during charge/discharge cycling of a current-generating cell in such manner as to reduce the tendency for limitedly coherent dendritic structures to bridge the electrodes and penetrate the separator. This is achieved by terminating the charging current when the overpotential between the working zinc electrode and a built-in zinc reference electrode exceeds a predetermined value. More specifically the invention is based, at least in part, on the discovery that zinc dendrite penetration of the separator does not occur if the overpotential of the cell is limited to within a critical range. According to another feature of the invention, it has been found that at low overpotentials the zinc is deposited in a fine, soft, nondendritic or mossy form and that only at high overpotentials are the zinc deposits dendritic in nature. It is only the dendritic zinc which penetrates the separator and therefore, by limiting the overpotential to within a critical range, control of the deposition of the zinc, the nature of the deposit, and therewith control of the penetration of the separator is realized. It thus is possible to regulate the nature of the zinc deposit at a zinc electrode in an electrochemical cell and therewith penetration of the separator merely by controlling the charging of the cell, namely charging the cell at or up to an overpotential below which and at which zinc dendrites are not formed. Thus, with identical electrolyte concentrations, temperatures and separator materials, similar electrode surfaces can receive relatively fine mossy deposits merely by ensuring that the charge overpotential does not exceed a maximum value which, of course, is a function of the above-specified parameters.

For a silver-zinc cell at room temperature, for example, the critical overpotential is about 75 millivolts. It is understood that for other conditions the critical overpotential may be different, but that the same can easily be determined by preliminary tests. For the above conditions and at an overpotential of 75 millivolts, the zinc deposit consists entirely of mossy zinc. At 100 millivolts, the deposit consists of a mixture of moss and dendrites, and above this potential the deposit consists entirely of dendrites, the latter causing penetration of the separator.

It has now been discovered that the problem of the deposit of active material in dendritic form can be controlled so as to prevent bridging, i.e., penetration of the separator, by including in the cell a reference electrode, preferably a zinc electrode, the current developed in a circuit established between the active zinc electrode and the reference electrode being used to activate a relay to discontinue further charging when the upper limit of the overpotential condition of the charge is reached.

The method aspect of this invention comprises the steps of applying charging current to the battery or cell and detecting the overpotential in a circuit established between the negative electrode and a reference electrode. The application of charging current is interrupted when the overpotential as measured in this latter circuit reaches a predetermined upper limit.

While zinc has been discussed hereinabove as the active material of the negative electrode and as being highly prone to dendrite formation, it will be understood that other active materials, as for example tin, may be substituted for zinc. The electrolyte is preferably alkaline in nature and most preferably is 31 to 44 percent KOH. The positive or counter electrode can be of the electrochemically reversible type having nickel/nickel oxide or silver/silver oxide masses. The reference electrode is preferably a rechargeable electrode but need not be so. The reference electrode is preferably a zinc electrode. If the same constitutes a rechargeable electrode, the cell can be provided with a relatively inert auxiliary electrode against which the reference electrode can be charged.

The separator material may be cellophane as for example PUDO–300 (Du Pont), polyvinyl alcohol, methyl cellulose derivative as for instance C-3 (Borden) and the like. It should be noted that, to a considerable extent, the magnitude of the overpotential depends on the properties of the membrane or separator. Thus, cellulosic materials which transport zincate at a relatively high rate can tolerate only a very small overpotential in excess of the overpotential necessary to form dendrites on the electrode without causing penetration.

The invention will be readily understood from the following description of certain embodiments given by way of example in conjunction with the accompanying drawing in which:

FIG. 1 is a diagrammatic cross section through a general view of one form of apparatus showing a current-interrupting system according to this invention; and FIG. 2 is a view similar to FIG. 1 diagrammatically illustrating an electrochemical system embodying the present invention.

Referring to FIGS. 1 and 2 of the drawing, it will be seen that the basic elements of one modification of a battery or cell according to the present invention are a silver positive electrode 1, a zinc negative electrode 2, and a zinc reference electrode 3. The latter electrodes are provided with the usual housing 4 which encloses an electrolyte 5 from which the zinc is deposited upon charging. The positive and negative electrodes 1 and 2 are separated by a separator 6, the reference electrode 3 being enclosed in another separator 7. In the case of the zinc (zinc/zinc-oxide electrode), the electrolyte is an alkaline solution and preferably contains an excess of a substance containing the active metal (e.g., zinc oxide). The zinc oxide may fully saturate the solution as zincate and the latter can be in equilibrium with a solid phase of this substance to maintain a saturated condition.

It is also possible, under similar operating conditions, to form dendritic or filamentary deposits of tin. Moreover, lithium can yield a microcrystalline and somewhat dendritic deposit from a nonaqueous medium (e.g., lithium chloride and propylene-carbonate mixtures), which is tenacious and which, similar to zinc, can penetrate the interelectrode separator, ultimately shorting the cell.

As indicated earlier, it is possible to avoid substantially entirely the formation of dendritic zinc by detecting the overpotential in said cell and interrupting the charging-current application to the cell when the overpotential reaches a predetermined upper value.

In the example depicted by FIGS. 1 and 2, the overpotential of the zinc reference electrode 3 to negative zinc electrode 2 is transmitted to a high-impedance voltmeter 8 which is set so that when a predetermined upper value for the overpotential is reached, it provides a signal activating a switch 9 for interrupting the supply of charging current to the cells from a DC source 10. A relay 12 is incorporated in the control system for selectively connecting the power source 10 with the cell or cells 11.

In FIG. 2, a series of three electrode cells 11 are provided, all of which are appropriately connected with a scanner 12. The scanner 12 serves to sequentially connect the negative and reference electrodes of each of the cells 11 to the high-impedence voltmeter 8, which measures the overpotential thereat. When the measured overpotential reaches or exceeds the critical value, the voltmeter, by means of the relay 12, terminates the charging operation.

The high-impedence voltmeter 8 is selected so as to be sufficiently sensitive and accurate for the above purpose. The sensitivity and accuracy should preferably be within 2 millivolts.

The switching system is similar to that described in commonly assigned copending application Ser. No. 651,243, of July 5, 1967, now abandoned. It is to be understood that the system therein, while similar, is utilized for an entirely different purpose and in the instant case has had to be adapted to the instant purpose.

It has been tacitly assumed above that the charging rate is held constant until the critical overpotential is reached. While this method may be preferable, other methods of charging may also be utilized provided the critical overpotential is not exceeded. For example, the charge rate may be arbitrarily set at a high enough value so that the critical overpotential is reached substantially at the inception of charge. Then, as the overpotential begins to rise, the current is progressively decreased to hold the overpotential at the critical value until the cell is fully charged. This type of operation can be carried out automatically by means of a constant-potential power supply of conventional nature which is readily available.

Obviously, the constant potential charge can be carried out at any overpotential lower than the critical overpotential, but, in general, the time to complete the charging will be longer.

Also various combinations of constant-current charge and constant-potential charge can be used so long as the critical overpotential is not exceeded.

When using the constant-overpotential method of charging, the current decreases continually. A study of the curves of current versus time has been carried out and shows that the charge input falls to very low values eventually. It is preferable to terminate the charge when the current drops to a value so low that the hourly rate of input is less than, e.g., about 1 percent of the integrated input up to that time.

It is possible to charge with a combination of constant current and constant overpotential. For instance, when charging in a constant-overpotential mode a cell with a capacity of 10 ampere-hours, it may be desirable to limit the initial current to 5 amperes until the critical overpotential is reached. At this point, the charging current is decreased so that the critical overpotential is not exceeded. Thus, the cell is charged initially in the constant-current mode and finally in the constant-overpotential mode. It may be desirable to limit the current to 5 amperes in order to protect the charging equipment.

For the metallic elements disclosed herein as being prone to cause penetration through the separator, the overpotentials generally lie in the range of 25 to 100 millivolts, but for zinc it is advantageous to limit the overpotential to the range of about 50 to 75 millivolts (preferably close to 75 millivolts).

Throughout this specification the term overpotential is applied to the potential of an individual electrode, as distinct from overvoltage which is commonly used for the terminal voltage of a cell or battery.

I claim:

1. A method of controlling dendritic growth of the active material of a negative electrode of an electrochemical system also including a positive electrode and an electrolyte contacting both said electrodes, comprising the steps of charging said negative electrode against said positive electrode, measuring the potential of said negative electrode against a source of reference potential independent of said positive electrode, and discontinuing the charging upon the difference of said potentials attaining a predetermined value indicative of the rise of the potential of said negative electrode toward a limit beyond which dendrite formation is liable to occur.

2. A method as defined in claim 1 wherein the source of reference potential is a further electrode consisting essentially of the same active material as said negative electrode, said further electrode being positioned in contact with said electrolyte but excluded from the charging circuit.

3. A method as defined in claim 2 wherein said active material is zinc.

4. A method as defined in claim 3 wherein charging is discontinued upon the potential difference between said negative electrode and said further electrode reaching a value corresponding to an overpotential of substantially 50 to 75 millivolts for said negative electrode.

5. A method as defined in claim 1 wherein charging is discontinued upon the difference of said potentials reaching a value corresponding to an overpotential of substantially 25 to 100 millivolts for said negative electrode.

6. A method as defined in claim 1 wherein the active material of said negative electrode is zinc, lithium or tin.

7. In an electrochemical system including a negative electrode with an active material prone to dendritic growth upon overcharging, a positive electrode, and an electrolyte contacting both said electrodes, the combination therewith of a third electrode in contact with said electrolyte but insulated from the other electrodes for generating a reference potential independent of said positive electrode, said third electrode consisting essentially of the same active material as said negative electrode, means including a cutoff switch for connecting said negative and positive electrodes in a charging circuit across a supply of unipolar current, and voltage-measuring means connected between said negative electrode and said third electrode for determining the potential difference therebetween, said voltage-measuring means being connected to said switch for interrupting said charging circuit upon said potential difference reaching a predetermined magnitude corresponding to an overpotential of said negative electrode beyond which dendrite formation is liable to occur.

8. The combination defined in claim 7 wherein said active material is zinc.

9. The combination defined in claim 7 wherein said positive electrode, said negative electrode and said third electrode are closely juxtaposed, further comprising separator means interposed between said juxtaposed electrodes.

* * * * *